US012714011B1

(12) United States Patent
Brown et al.

(10) Patent No.: US 12,714,011 B1
(45) Date of Patent: Aug. 25, 2026

(54) NON-CENTRALIZED CONTROL SYSTEM FOR A MOWER

(71) Applicant: Parker-Hannifin Corporation, Cleveland, OH (US)

(72) Inventors: Alyn Brown, Nashville, IN (US); Todd A. Link, Gray, TN (US); Randall D. Thompson, Lancaster, SC (US); Jason S. Richardson, Chuckey, TN (US); Kyle J. Merrill, Chuckey, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 501 days.

(21) Appl. No.: 18/342,799

(22) Filed: Jun. 28, 2023

Related U.S. Application Data

(60) Provisional application No. 63/433,494, filed on Dec. 19, 2022, provisional application No. 63/358,668, filed on Jul. 6, 2022.

(51) Int. Cl.
*B60L 15/20* (2006.01)
*A01D 34/00* (2006.01)
(Continued)

(52) U.S. Cl.
CPC ........... *A01D 34/006* (2013.01); *A01D 34/66* (2013.01); *A01D 34/78* (2013.01); *B60L 15/20* (2013.01); *B60L 58/12* (2019.02); *H01M 10/425* (2013.01); *A01D 34/824* (2013.01); *A01D 2101/00* (2013.01); *B60L 2200/40* (2013.01);
(Continued)

(58) Field of Classification Search
CPC .... A01D 34/006; A01D 34/78; A01D 34/824; B60L 2200/40; B60L 2250/16; B60L 2250/24; H01M 2220/20
See application file for complete search history.

(56) References Cited

U.S. PATENT DOCUMENTS

| | | | |
|---|---|---|---|
| 4,385,863 | A | 5/1983 | Minor |
| 5,481,078 | A | 1/1996 | Asche |

(Continued)

FOREIGN PATENT DOCUMENTS

| | | | | |
|---|---|---|---|---|
| KR | 102136399 B1 | | 7/2020 | |
| WO | WO-2021047195 A1 | * | 3/2021 | ............ A01D 34/00 |

OTHER PUBLICATIONS

English Translation of WO-2021047195-A1 (Year: 2021).*
Non-Final Office Action issued by the U.S. Patent Office in U.S. Appl. No. 18/888,804 dated Jan. 12, 2026.

*Primary Examiner* — Claude J Brown
(74) *Attorney, Agent, or Firm* — McDonnell Boehnen Hulbert & Berghoff LLP

(57) ABSTRACT

An example control system for a mower includes a communication bus; and a plurality of devices that are communicatively-coupled to the communication bus, such that each device of the plurality of devices is in direct communication with other devices of the plurality of devices. The plurality of devices include: at least one drive motor controller of an electric motor configured to drive the mower, at least one blade motor controller of a respective electric motor configured to drive a blade of a mower deck of the mower, an input device configured to be operated by an operator of the mower, and a operator presence module configured to provide a signal to the communication bus indicating presence of the operator.

20 Claims, 9 Drawing Sheets

(51) Int. Cl.

| | |
|---|---|
| ***A01D 34/66*** | (2006.01) |
| ***A01D 34/78*** | (2006.01) |
| ***B60L 58/12*** | (2019.01) |
| ***H01M 10/42*** | (2006.01) |
| *A01D 34/82* | (2006.01) |
| *A01D 101/00* | (2006.01) |

(52) U.S. Cl.
CPC ....... *B60L 2250/16* (2013.01); *B60L 2250/24* (2013.01); *H01M 2010/4271* (2013.01); *H01M 2220/20* (2013.01)

(56) References Cited

U.S. PATENT DOCUMENTS

| | | | | |
|---|---|---|---|---|
| 5,931,254 | A | 8/1999 | Loraas | |
| 6,226,902 | B1 * | 5/2001 | Heyne | E02F 9/2004 37/348 |
| 9,265,196 | B2 | 2/2016 | Albinger et al. | |
| 9,980,434 | B1 | 5/2018 | Brown et al. | |
| 10,058,031 | B1 * | 8/2018 | Brown | B60K 7/0007 |
| 10,919,463 | B1 | 2/2021 | Brown et al. | |
| 11,395,458 | B1 | 7/2022 | Brown et al. | |
| 11,427,203 | B1 | 8/2022 | Brown et al. | |
| 2009/0229785 | A1 * | 9/2009 | Kadle | B60N 2/5628 297/180.12 |
| 2011/0191003 | A1 | 8/2011 | Laval | |
| 2017/0123414 | A1 | 5/2017 | Gray | |
| 2019/0291779 | A1 | 9/2019 | Zeiler et al. | |
| 2021/0107420 | A1 * | 4/2021 | Schaub | G01R 27/2605 |
| 2022/0205402 | A1 | 6/2022 | Albinger et al. | |
| 2023/0035095 | A1 | 2/2023 | Tevis | |

* cited by examiner 802 804 806 808

718

800

502

528

906

900

Seat PTO Blades Warnings

904

100%

Hours

910

908

Time to Maintenance

902

912

Warnings

Map

0%

NON-CENTRALIZED CONTROL SYSTEM FOR A MOWER

CROSS REFERENCE TO RELATED APPLICATION

The present application claims priority to U.S. Provisional Application No. 63/358,668 filed on Jul. 6, 2022 and U.S. Provisional Application No. 63/433,494 filed on Dec. 19, 2022, the entire contents of all of which are herein incorporated by reference as if fully set forth in this description.

TECHNICAL FIELD

This disclosure relates to a distributed, non-centralized control system for a mower. More particularly, this disclosure relates to a mower having a communication bus that facilitates direct communication between various devices and modules of a mower without a centralized or primary processor.

BACKGROUND

The turf market is transitioning zero-turn-radius (ZTR) mowers from hydrostatic ground drive and belt driven mower decks to electric drives for all functions. Traditional electronic control systems rely on a centralized processor or centralized "brain" to make operational decisions about a vehicle. For example, in a traditional electronic control system, user inputs are fed into a central processor. These user inputs are then processed by the central processor, which then sends control signals to the various components that are being controlled. For example, in a ZTR, user inputs could be generated from lap bar inputs, then transmitted to the central processor, which then transmits command signals to the drive motor controllers.

The central processor of such control architecture represents a single point of failure, rendering the system less reliable. Particularly, any failure or malfunction in the central processor can preclude the entire mower from working. It may thus be desirable to have a control system architecture that is more reliable. It is with respect to these and other considerations that the disclosure made herein is presented.

SUMMARY

The present disclosure describes implementations that relate to a non-centralized control system for a mower.

In a first example implementation, the present disclosure describes a control system of a mower. The control system includes: a communication bus; and a plurality of devices that are communicatively-coupled to the communication bus, such that each device of the plurality of devices is in direct communication with other devices of the plurality of devices, wherein the plurality of devices comprise: at least one drive motor controller of an electric motor configured to drive the mower, at least one blade motor controller of a respective electric motor configured to drive one or more blades of a mower deck of the mower, an input device configured to be operated by an operator of the mower, and an operator presence module configured to provide a signal to the communication bus indicating presence of the operator.

In a second example implementation, the present disclosure describes a mower. The mower includes: a first wheel; a second wheel; at least one electric motor configured to propel the first wheel and the second wheel; a mower deck comprising at least one respective electric motor configured to spin one or more blades disposed in the mower deck; and the control system of the first example implementation.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

Disclose herein are decentralized control systems allowing the processing power to be split between various components. Each component of a system can handle its own safety decisions, and behaviors. As such, the disclosed systems eliminate the need for a centralized controller that makes operational decisions for the entire system, and eliminate the risk of a single point of failure.

Figure 1A:
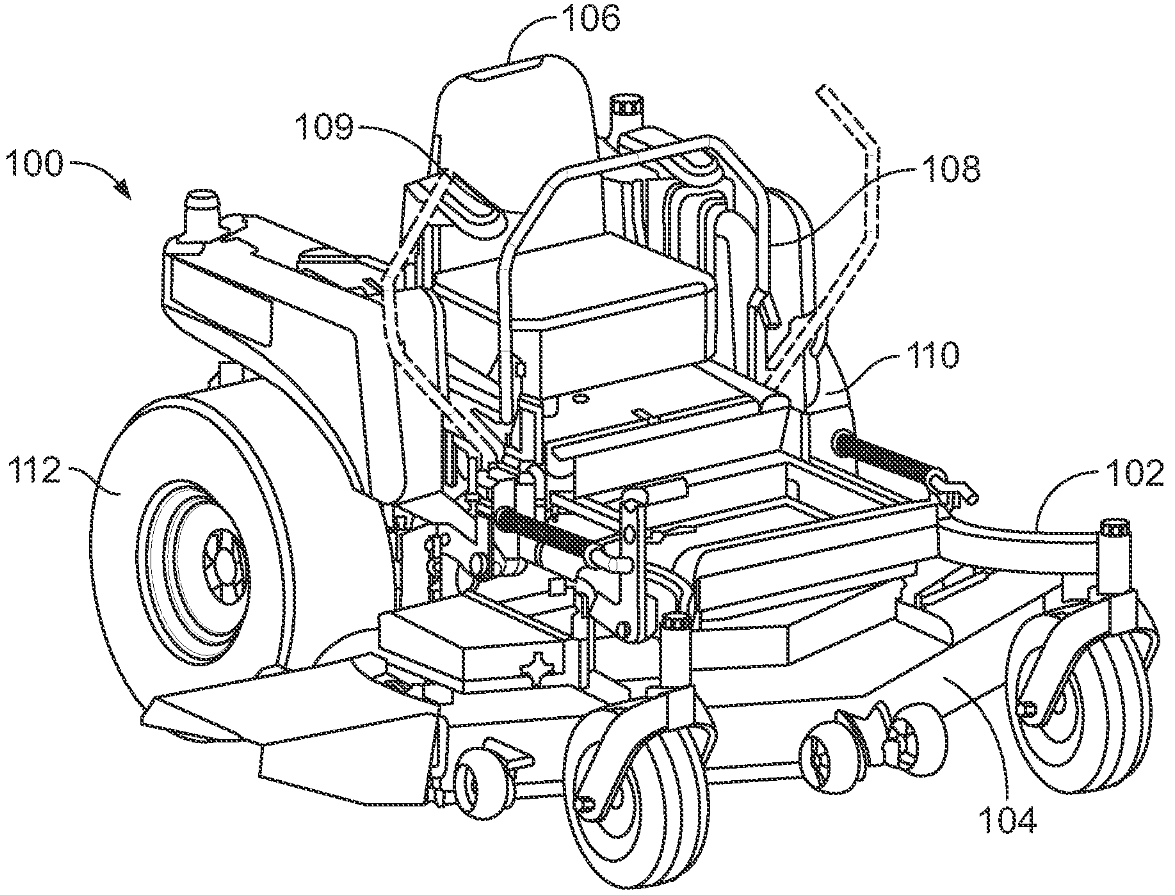
FIG. 1A illustrates a perspective view of a mower, in accordance with an example implementation.

FIG. 1A illustrates a perspective view of a mower 100, in accordance with an example implementation. The mower 100 can be, for example, a ZTR mower (e.g., a lawn mower with a turning radius that is effectively zero).

The mower 100 includes a frame 102. The mower 100 also includes a mower deck 104 supported by the frame 102. The mower deck 104 can house one or more blades (e.g., three blades) for mowing grass, for example. The mower 100 further includes an operator seat 106 and steering control levers 108, 109 for operating the mower 100. The steering control levers 108, 109 are shown in FIG. 1A as lap bars, but other configurations could be used.

In examples, a rear mounted engine (not shown) can be mounted to the frame 102 behind the operator seat 106. The engine can be an internal combustion engine configured to drive a power generator. The power generator then provides electric power to one or more electric motors that drive respective rear wheels such as left wheel 110 and right wheel 112 that propel the mower 100, for example. The power generator can also provide power to electric motors that drive the blades of the mower deck 104.

In another example, rather than using an engine and a power generator, the mower 100 can be a battery-driven vehicle. Particularly, the mower 100 can have a rechargeable battery that provides electric power to drive the various motors.

The steering control levers 108, 109 can be configured to control speed and direction of the wheels 110, 112 via actuating the respective electric motors. Thus, the drive system can be controlled by an operator to drive the wheels 110, 112 independently, and propel the mower 100. The configuration of the mower 100 is an example configuration and it should be understood that other mower configurations and vehicle types could be used.

Thus, the mower 100 can have several electric motors. For example, the mower 100 can have two traction or propulsion electric motors respectively driving the wheels 110, 112 of the mower 100, and may include one or more electric motors driving respective blades mounted to the mower deck 104.

Figure 1B:
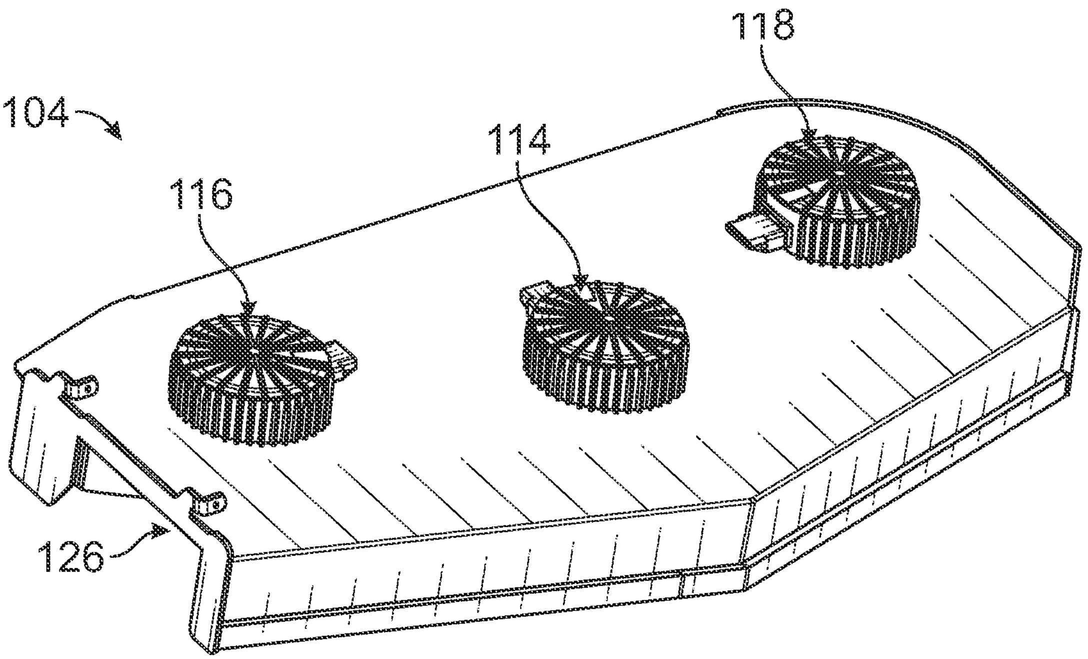
FIG. 1B illustrates a perspective view of a mower deck with electric motors driving blades of the mower deck, in accordance with an example implementation.
Figure 1C:
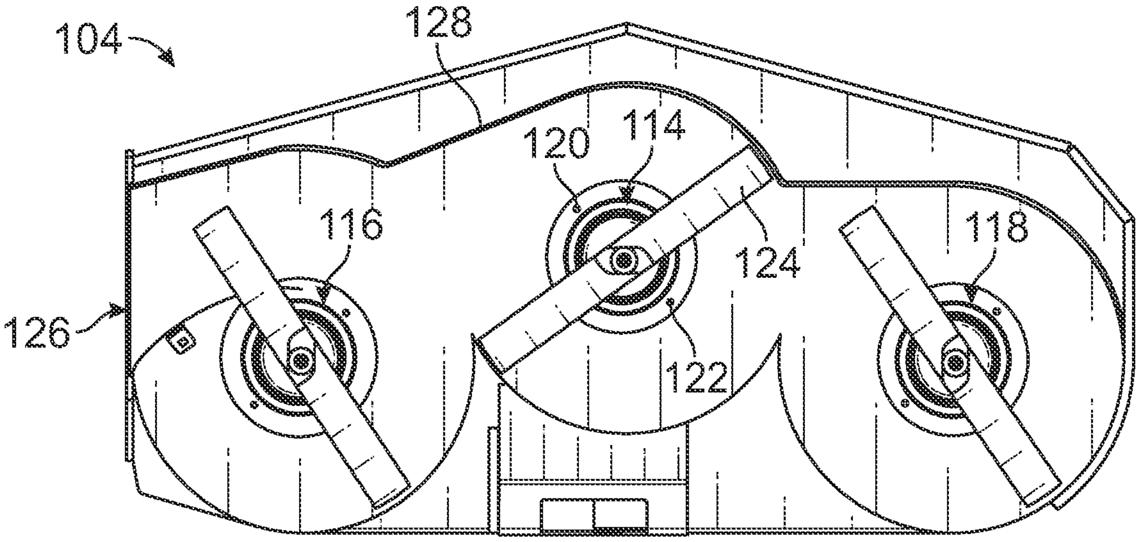
FIG. 1C illustrates a bottom view of the mower deck of FIG. 1B, in accordance with an example implementation.

FIG. 1B illustrates a perspective view of the mower deck 104 with electric motors driving blades of the mower deck 104, and FIG. 1C illustrates a bottom view of the mower deck 104, in accordance with an example implementation. The mower deck 104 can be made of sheet metal for example, and may include a plurality of electric motors such as electric motor 114, electric motor 116, and electric motor 118. Although three electric motors are shown, in other example implementations, more or fewer electric motors and blades could be used.

The electric motors 114-118 can be coupled to the mower deck 104 via fasteners (bolts, screws, etc.). For example, as shown in FIG. 1C, the electric motor 114 is coupled to the mower deck 104 via a bolt 120 and bolt 122.

Referring to FIG. 1C, each of the electric motors 114-118 can be coupled to and is configured to drive a blade for cutting grass. For example, the electric motor 114 is coupled to a blade 124 for cutting grass. The mower deck 104 has an outlet 126 for discharging grass that is cut by the blades of the mower deck 104. The mower deck 104 can include baffles such as baffle 128 that are curved to streamline air flow and direct cut grass to the outlet 126 to be discharged from the mower deck 104.

The mower 100 can include a variety of other input devices (e.g., buttons and switches) and may include a plurality of sensors (e.g., a seat switch). In conventional configurations, the input devices of a vehicle are connected to a central processor or controller. Such central processor then sends outputs (e.g., commands) to other components of the vehicle.

Figure 2:
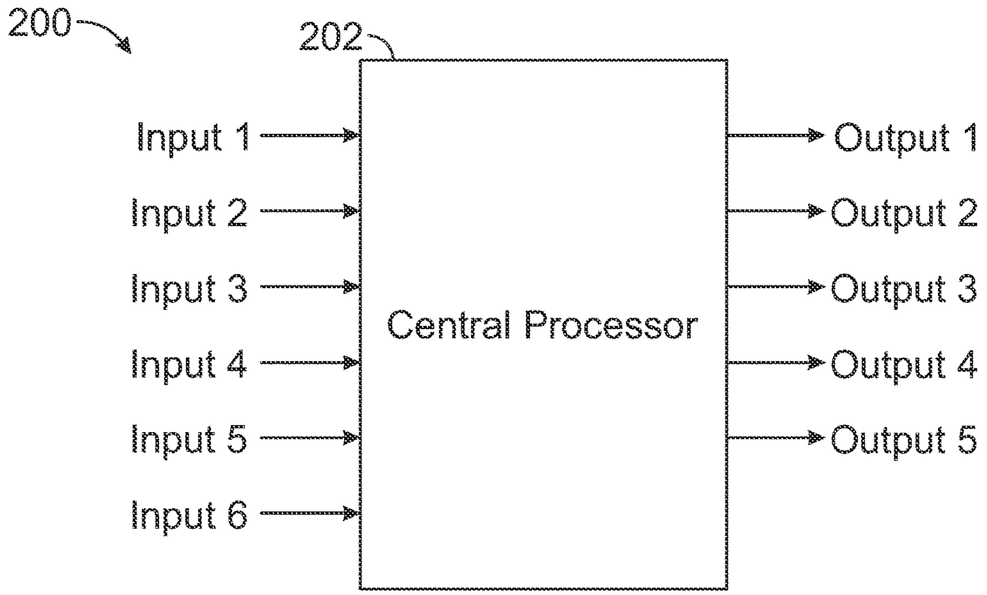
FIG. 2 illustrates a control system having a central processor.

FIG. 2 illustrates a control system 200 having a central processor 202. All the inputs of a vehicle (e.g., switches, buttons, user inputs, sensors, etc.) labelled input 1 to input 6 provide their signals to the central processor 202. These inputs are processed by the central processor 202, which then outputs control signals labelled output 1 to output 5 to the various components that are being controlled.

A drawback of the control system 200 is that the components are not in direct communication with each other, and if one components fails, the other components might not be "aware" that such component has failed. This issue is exacerbated when there are a plurality of sensors, switches, or input devices communicating just with the central processor 202. If a component or input device fails, the central processor 202 may operate the vehicle in a safe mode, but it is difficult to troubleshoot the vehicle to determine which component failed.

Further, the central processor 202 represents a single point of failure. Particularly, any failure or malfunction in the central processor 202 can preclude the entire vehicle from working. Such configuration may be undesirable as it might reduce availability and reliability of the vehicle.

Figure 3:
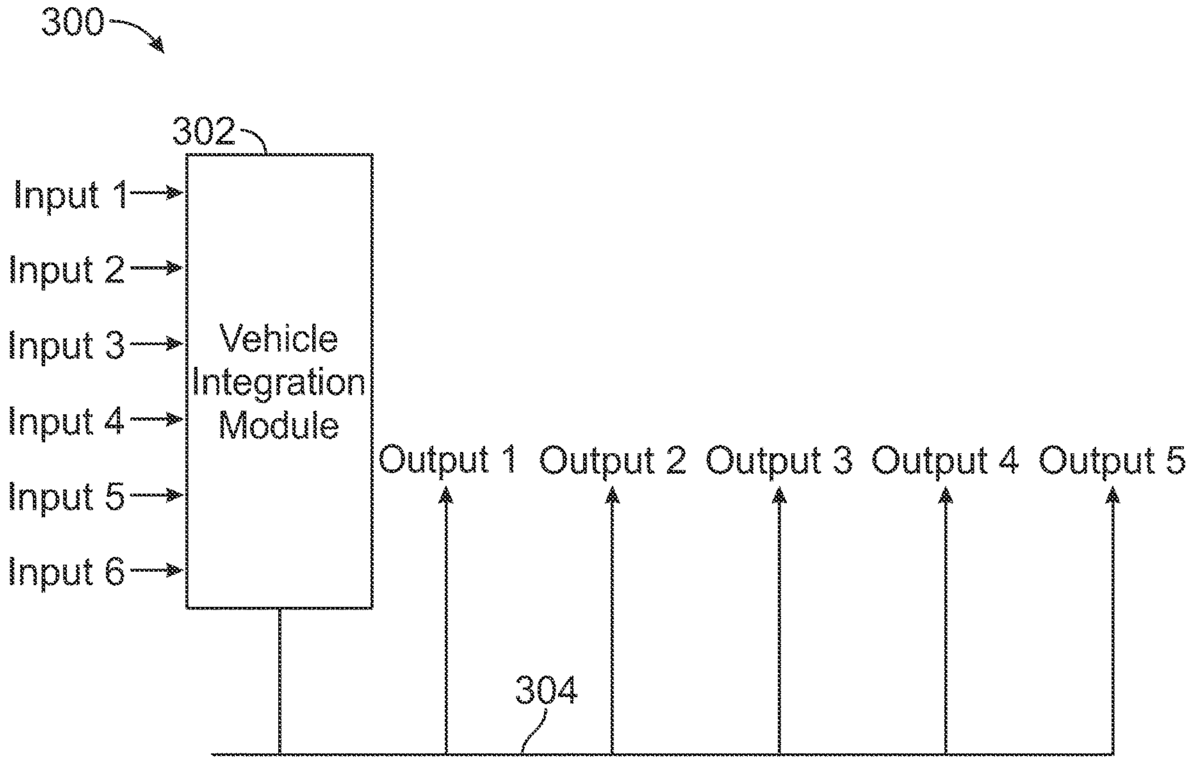
FIG. 3 illustrates a control system having a vehicle integration module.

FIG. 3 illustrates a control system 300 having a vehicle integration module (VIM) 302. Similar to the control system 200, in the control system 300 the various input devices provide their inputs to the VIM 302, which then communicates with other components (e.g., motors) via a communication bus 304. In this configuration, the VIM 302 receives all the inputs from the various input devices, processes the inputs, and may then output a "Go" or "No Go" message onto the communication bus 304. Similar to the control system 200, there might not be away for individual components to provide an indication of their health status, so the other components might not be able to independently verify the status of any of the input devices. It may thus be difficult to troubleshoot such a system in the case of failure of one or more components. Further, the VIM 302 also represents a single point of failure similar to the central processor 202.

Figure 4:
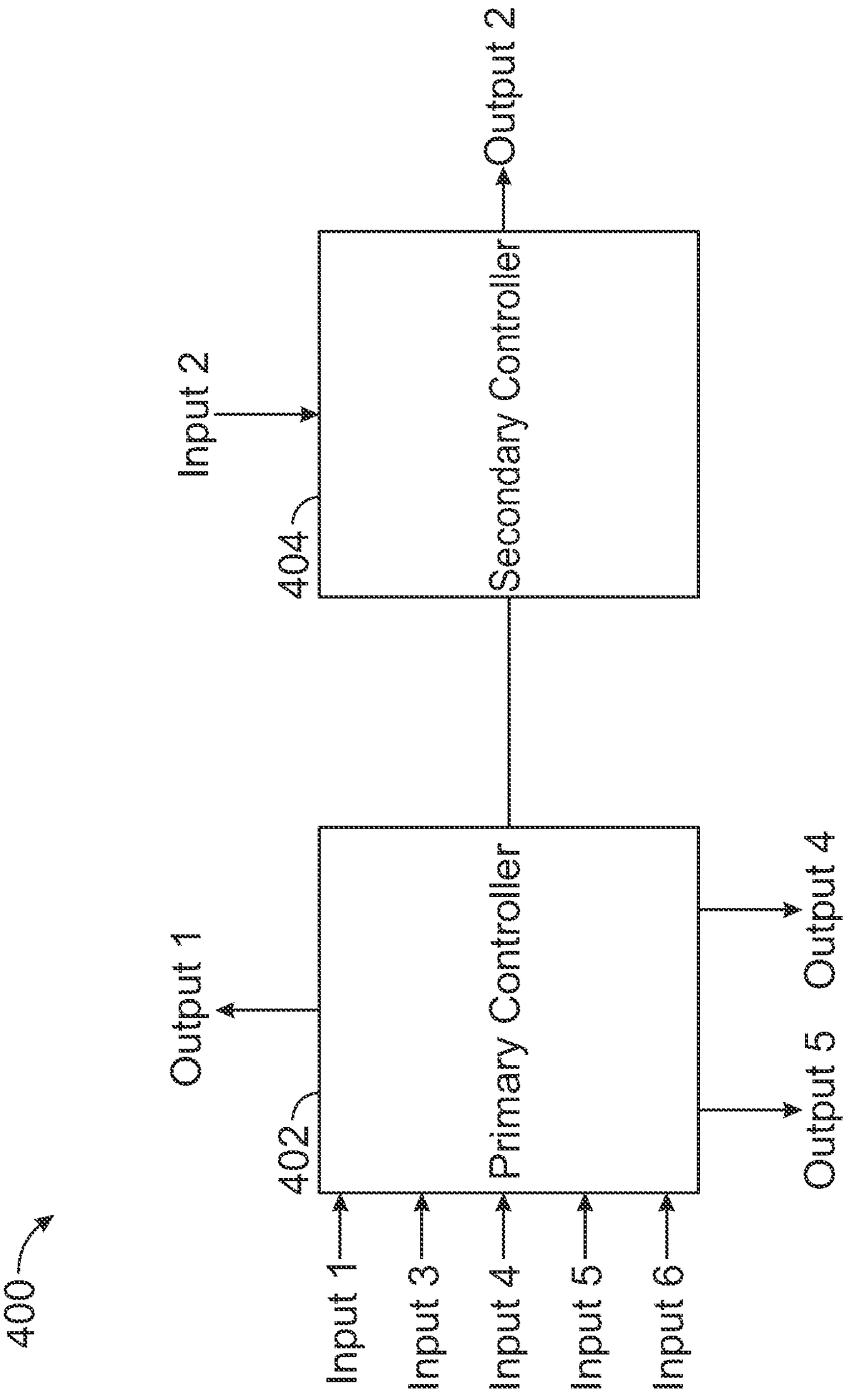
FIG. 4 illustrates a control system having a primary controller and a secondary controller.

FIG. 4 illustrates a control system 400 having a master or primary controller 402 and a slave or secondary controller 404. In the control system 400, one of the vehicle controllers (e.g., one of the traction motor controllers) may be configured as a central processor receiving the majority of inputs from the input devices, processing the inputs, and providing a "Go" or "No Go" signal to other components, e.g., to the secondary controller 404. In other words, the functionality of a central processor is incorporated into the primary controller 402. As such, the control system 400 may suffer the same disadvantages of the control system 200.

Further, the control systems 200, 300, 400 may all include a complex wiring harness that may be costly, hard to install, and require certain devices to be plugged into the exact correct spot.

It may thus be desirable to configure a control system having a communication network bus that allows any and all of the plurality of connected devices of a vehicle to communicate instantaneously and directly with any and all of the other connected devices on the network. In other words, each of these devices is in continual, direct communication with all of the other components on the network via the communication bus.

Each component or device may output information (e.g., signals) indicating its state as well as its health (e.g., whether the device is operating correctly or an error has occurred). All the other components of the vehicle receive such information directly, without intermediate components, and may be programmed to reach independently to such information.

This configuration effectively de-centralizes decision processing away from a single point (e.g., the central processor 202, the VIM 302, or the primary controller 402) and incorporates redundancy in the control system. Further, this control system may eliminate the use of complex wire harnesses.

Figure 5:
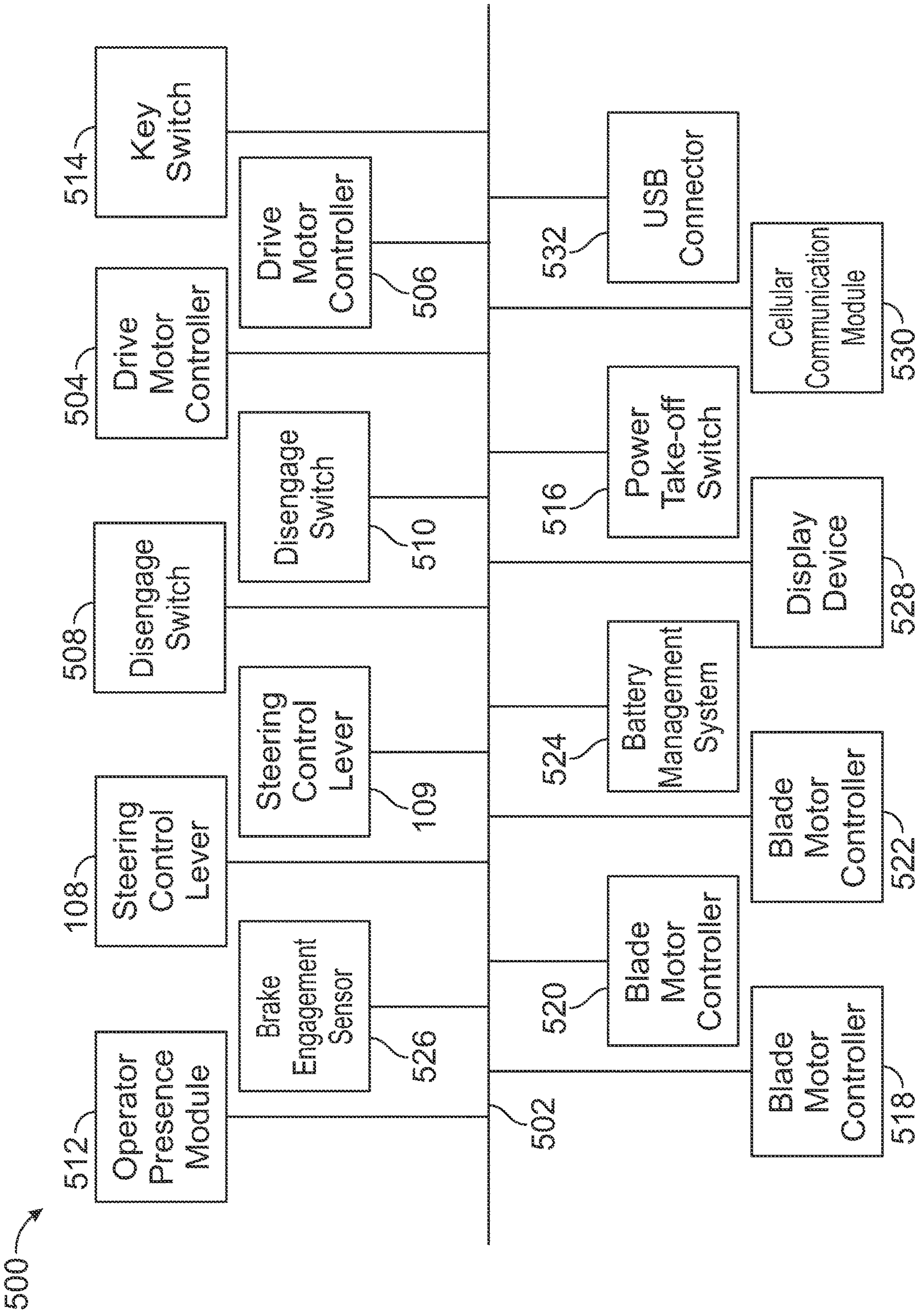
FIG. 5 illustrates a control system, in accordance with an example implementation.

FIG. 5 illustrates a control system 500, in accordance with an example implementation. In contrast to the control systems 200, 300, 400, the control system 500 does not include a central processor, VIM, or primary controller. Rather, components of the control system 500 are connected directly to a communication bus 502, and communicate continually and directly with each other.

In other words, the control system 500 has an architecture that is distributed or non-centralized, allowing various components (e.g., sensors, devices, switches, control modules, etc.) of the mower 100 to communicate with each other directly using a bus communication architecture. Each component may be configured to handle its own safety decisions and behavior.

As an example, the communication bus 502 can be any type of a serial communication bus such as a controller area network (CAN) bus or a universal serial bus (USB). In an example, the communication bus 502 is part of a communication network (e.g., a CAN network) that involves a message-based protocol allowing direct communication between various devices/components of the mower 100. For each device, the data in a data frame is transmitted serially in such a way that if more than one device transmits at the same time, the highest priority device can continue while the other devices can back off sending their messages. Data frames are received by all devices, including by the transmitting device. With this configuration, all of the plurality of connected devices of the control system 500 can communicate substantially instantaneously with any and all of the other devices connected to the communication bus 502. Other communication protocols that could be used include Local Interconnect Network (LIN), Inter-Integrated Circuit (I2C), Serial Peripheral Interface (SPI), Universal Asynchronous Receiver/Transmitter (UART), CAN OPEN, RS-485, Ether for Control Automation Technology (Ether CAT), etc.

The devices of the control system 500 can include a battery, a plurality of sensors, input devices, modules, controllers, motors, etc. For example, the control system 500 can include the steering control levers 108, 109 providing signals to the communication bus 502. The signals from the steering control levers 108, 109 may operate as throttle indicators or commands providing an analog voltage signal (e.g., between −5 volts and +5 volts). The signal from the steering control lever 108 is transmitted via the communication bus 502 to a drive motor controller 504 configured to drive the electric motor propelling the left wheel 110. Similarly, the signal from the steering control lever 109 is transmitted via the communication bus 502 to a drive motor controller 506 configured to drive the electric motor propelling the right wheel 112.

In an example, the drive motor controllers 504, 506 can each include a controller and an inverter. The inverter can be configured as a power converter that converts direct current (DC) power received at the inverter (e.g., received from a battery) to three-phase, alternating current (AC) power that can be provided to wire windings of a stator of the respective electric motor to drive the electric motor. The controller may have a microprocessor that provides a pulse width modulated (PWM) signal to operate the power converter of the inverter, for example.

The control system 500 can include variety of sensors and switches. For example, the control system 500 may include a disengage switch 508 and a disengage switch 510. The disengage switch 508 may be associated with the steering control lever 108, for example. If the steering control lever 108 is placed in a neutral or disengage position (e.g., when the operator wishes to stop the mower 100), the disengage switch 508 provides a confirmation that the steering control lever 108 is placed in the neutral position in addition to the signal from the steering control lever 108 indicating a neutral or disengage position.

For example, on some mowers, the steering control lever 108 may be pushed by the operator all the way in one direction to place the steering control lever 108 in a disengage position. In some examples, placing the steering control lever 108 in a disengage position may engage a parking brake of the mower 100. The disengage switch 508 may be a mechanical switch, a Hall-Effector sensor, or a magnetic sensor configured to detect that the steering control lever 108 has reached such disengage position. In some examples, multiple position detecting devices or sensors may be combined into an assembly coupled to the steering control lever 108. In response to placing the steering control lever 108 in a disengage position, the disengage switch 508 outputs a signal on the communication bus 502 indicating that the steering control lever 108 is in the disengage position, thereby causing the drive motor controller 504 to go to a sleep mode, for example. The disengage switch 510 operates in a similar manner with respect to the steering control lever 109 and the drive motor controller 506.

The control system 500 may further include several sensors or switches that indicate whether the mower 100 is ready for operation or should be turned off (or placed in a sleep mode). For example, the control system 500 may include an operator presence module 512 connected to the communication bus 502. The term "module" is used generally herein to include software, hardware, or a combination of software and hardware components. Further, the terms "module," "component," and "device" are used interchangeably.

As described below with respect to FIGS. 6A-6B, the operator presence module 512 can have an operator presence switch (e.g., seat switch, sensor on a standing platform, touch sensitive sensor on the steering control levers 108, 109, etc.) that is configured to detect operator presence (e.g., detect whether the operator is seated at the operator seat 106 of the mower 100, and is thus about to operate the mower 100). The operator presence module 512 can then broadcast on the communication bus 502 whether the operator is present to allow other devices to take appropriate actions (e.g., enable the drive motor controllers 504, 506 to operate their respective electric motors).

The control system 500 can further include key switch 514. If the operator places a key in a key hole or press a "turn on" button (or a combination of the two), the key switch 514 broadcasts a signal to the communication bus 502 for other components to receive an indication that the operator is ready to operate the mower 100. In an example, the key switch 514 can be implemented as a keypad combination style configuration, and may be integrated into a display or as a dedicated keypad.

The control system 500 can further include several blade motor controllers to operate the electric motors that drive the blades of the mower deck 104 depending on the number of blades. For example, as shown and described with respect to FIG. 1C, the mower 100 may include three electric motors 114-118 driving three respective blades. Each electric motor is controlled by a respective blade motor controller. As such, the control system 500 includes a blade motor controller 518, a blade motor controller 520, and a blade motor controller 522, each blade motor controller operating a respective electric motor coupled to a respective blade.

In an example, the mower 100 may have a power take-off (PTO) switch 516 that the operator uses to command the blades (e.g., the blade 124) of the mower deck 104 to spin. As such, activation of the PTO switch 516 by the operator indicates to the blade motor controllers 518-522 of the mower 100 that the operator is ready to cut grass and wants the blades to spin.

In an example, when the mower 100 is battery-powered, the mower 100 includes a battery that may have several battery modules, each module having a respective plurality of battery cells. In this example, the control system 500 can include a battery management system (BMS) 524 configured as an electronic regulator that monitors and controls the charging and discharging of battery modules.

In an example, the BMS 524 may be configured to measure voltages of the battery modules and stop charging them when a desired voltage is reached. Further, the BMS 524 can be configured to monitor parameters that affect life and/or performance of the battery modules as well as ensuring safe operation of the battery modules. Safe operation includes, as examples, operating below a threshold temperature to increase the lifespan of the battery modules, preclude overheating, preclude failure of the battery modules, etc.

The BMS 524 can further monitor and control main power voltage, battery or cell voltage, charging and discharging rates of the battery modules, temperatures of the battery modules or their individual cells, health of the battery modules or their individual cells, coolant temperature and flow for air or liquid cooling parameters of a cooling system of the battery modules or their individual cells, etc. The BMS 524 may also be configured to limit the amount of current drawn from the battery or provided to the battery during if the battery is in a regeneration mode. As such, the BMS 524 can broadcast signals to the communication bus 502 indicating whether the battery that powers the electric motors is ready (e.g., has enough charge, operating at an acceptable temperature, etc.).

The mower 100 may include pedals, levers, or an electronic switch (which could be integrated into the steering control levers) to engage the parking brakes of the mower 100. If the operator engages the parking brakes, then the operator does not intend to operate the mower 100 further, but is rather placing it in a parked position.

Thus, the control system 500 can have a brake engagement sensor 526 coupled to the braking pedal or lever. The brake engagement sensor 526 is configured to broadcast on the communication bus 502 a signal indicating whether the parking brake is engaged or not.

Figure 9:
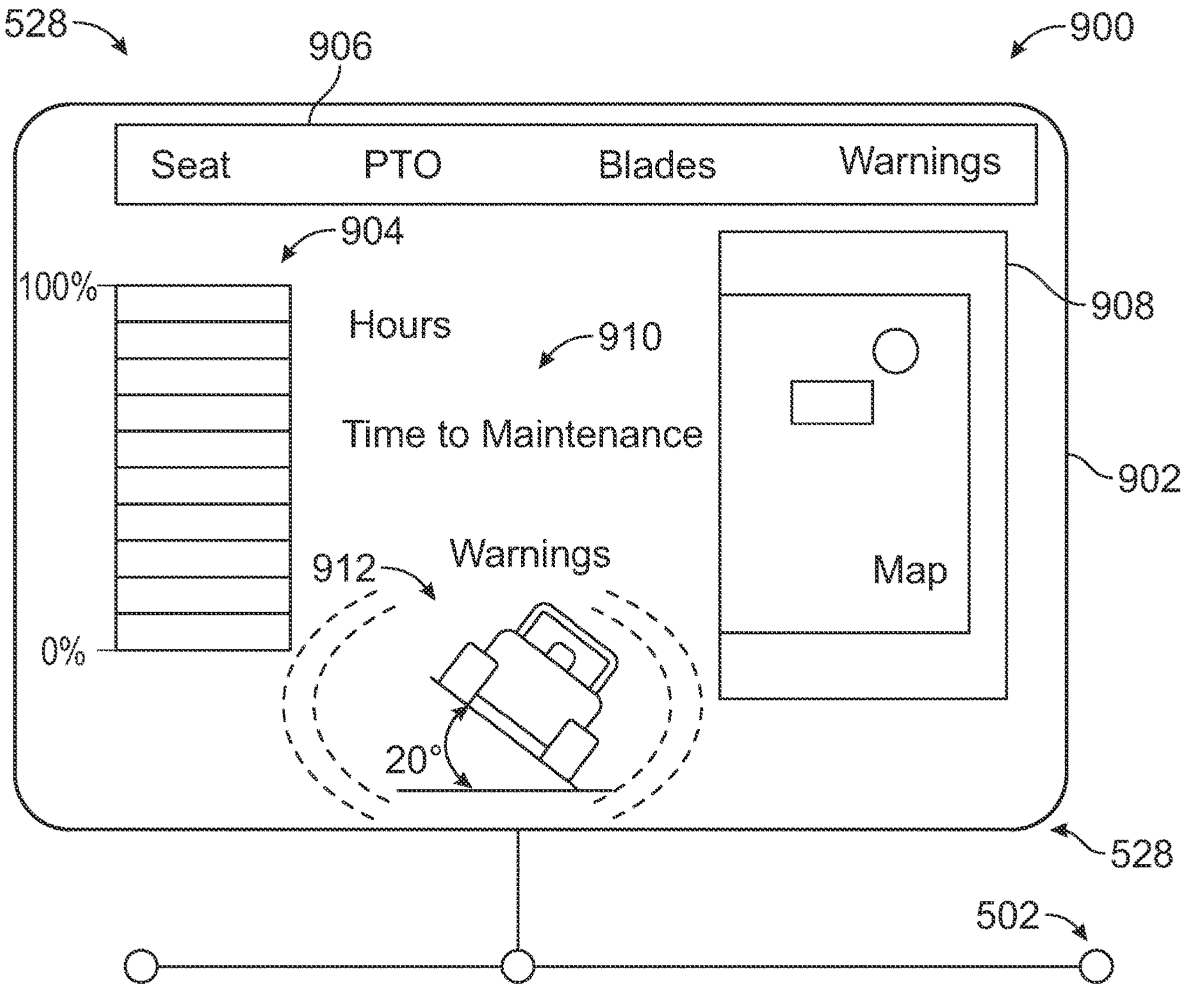
FIG. 9 illustrates a display device, in accordance with an example implementation.

In an example, the control system 500 can further include a display device 528. The display device 528 is configured to display information to the operator of the mower 100 and can be used also as an input device. For instance, the display device 528 can include a touchscreen that allows the operator of the mower 100 to interact with various components of the control system 500 and obtain various information as desired, while also providing operating commands to components or devices. FIG. 9 described below provides an example of the display device 528 and the information that could be displayed thereon.

In an example, the control system 500 includes a cellular communication module 530. The cellular communication module 530 allows the mower 100 to communicate with remote computing devices (e.g., remote servers), for example, using a cellular communication protocol such as CDMA (e.g., 1×RTT or 1×EV-DO), WiMAX, LTE, IDEN, GSM, WIFI, HSPA, etc.). As an example, the control system 500 may communicate information indicative of a condition of the mower 100 and its various components to a server. Such information may be helpful in determining whether the mower 100 is due for maintenance, for example. Such a remote server may also be used to communicate software updates (e.g., "over the air" updates) to the control system 500, for example, via the cellular communication module 530.

In an example, the control system 500 may include a USB connector 532. The USB connector 532 can be used to plug a computing device (e.g., a laptop) to the mower 100 to capture and download data (e.g., diagnostic data) stored in a memory (not shown) of the control system 500, for example. Such computing device can also be used to provide software updates to the control system 500, change calibration parameters of various modules of the control system 500, etc.

The devices (e.g., components, modules, sensors, etc.) shown in FIG. 5 are examples. More or fewer devices can be used.

Components of the control system 500 may be configured to work in an interconnected fashion with each other and/or with other components coupled to respective systems. One or more of the described operations or components of the control system 500 may be divided up into additional operational or physical components, or combined into fewer operational or physical components. In some further examples, additional operational and/or physical components may be added to the control system 500. Still further, any of the components or modules of the control system 500 may include or be provided in the form of a processor (e.g., a microprocessor, a digital signal processor, etc.) configured to execute program code including one or more instructions for implementing logical operations described herein.

The control system 500 may further include any type of computer readable medium (non-transitory medium) or memory, for example, such as a storage device including a disk or hard drive, to store the program code that when executed by one or more processors cause the control system 500 to perform the operations described above. In an example, the control system 500 may be included within other systems.

Advantageously, each of the devices connected to the communication bus 502 of the control system 500 is in continual, direct communication with all of the other devices via the communication bus 502. Thus, each device receives signals directly from other devices, and may react accordingly without an intermediary device.

For example, the operator presence module 512 may provide a signal indicating that the operator is present, and such a signal being broadcast over the communication bus 502 operates as an enable signal to other modules. Similarly, the brake engagement sensor 526 may indicate via a signal broadcast via the communication bus 502 that the operator has released the parking brake. The PTO switch 516 may also indicate over the communication bus 502 that the operator has activated it. Further, the BMS 524 may indicate the status of the battery, e.g., that the battery is in a healthy condition, charged, and ready to power the electric motors.

The blade motor controllers 518-522 directly receive these signals from such devices, sensors, and modules over the communication bus 502. In response, the blade motor controllers 518-522 may automatically place the respective electric motors in a standby mode to be ready to spin the respective blades. Further, the drive motor controllers 504, 506 automatically place the electric motors coupled to the wheels 110, 112 into a standby mode to be ready to propel the mower 100 as soon as the steering control levers 108, 109 are operated or actuated.

As the operator actuates the steering control levers 108, 109, the steering control levers 108, 109 provide command signals via the communication bus 502 indicating the position of the steering control levers 108, 109. The drive motor controllers 504-506 receive such command signals, and responsively operate the electric motors coupled to the wheels 110, 112 to propel the mower 100 to achieve the speeds and directions indicated by the command signals.

If the operator presence module 512 indicates that the operator status has changed (e.g., the operator is no longer seated at the operator seat 106 of the mower 100) or the parking brakes are engaged, or the BMS 524 indicates a low charge on the battery, the various devices of the control system 500 can react accordingly. For instance, the drive motor controllers 504-506 can disable their respective electric motors. In another example, if the brake engagement sensor 526 indicates that the brakes have been engaged, the blade motor controller 518-522 may cause the blades to stop spinning. In an example, each individual drive motor controller can also respond to the activities, actions, status, of the other motor controllers on the network. For example if drive motor controller 504 goes into a "Limp home mode", then the drive motor controller 506 may be programmed to also enter the "limp home mode." Each device connected to the communication bus 502 can react independently as programmed.

With this configuration, the control system 500 de-centralizes decision processing, in contrast with an architecture in which a central controller, a VIM, or a primary controller receives and processes all input information then provides command signals accordingly. Such a central controller would be a single point of failure that is eliminated by the control system 500, in which each devices is independent, and is in direct communication with other devices.

Additionally, in an example, each of the modules and sensors communicatively-coupled to the communication bus 502 can broadcast information indicative of its health (e.g., whether any fault has occurred). Particularly, each device may have its own microcontroller (e.g., microprocessor) that processes information from sensors associated with the device, and provide such information accordingly. If a component failure or a fault occurs, the microcontroller may broadcast a signal indicating the failure on the communication bus 502. Each device of the control system 500 can then react independently. For instance, the drive motor controllers 506-506 may disable the electric motors coupled to the wheels 110, 112, and the blade motor controllers 518-522 may similarly disable the blade electric motors.

Figure 6A:
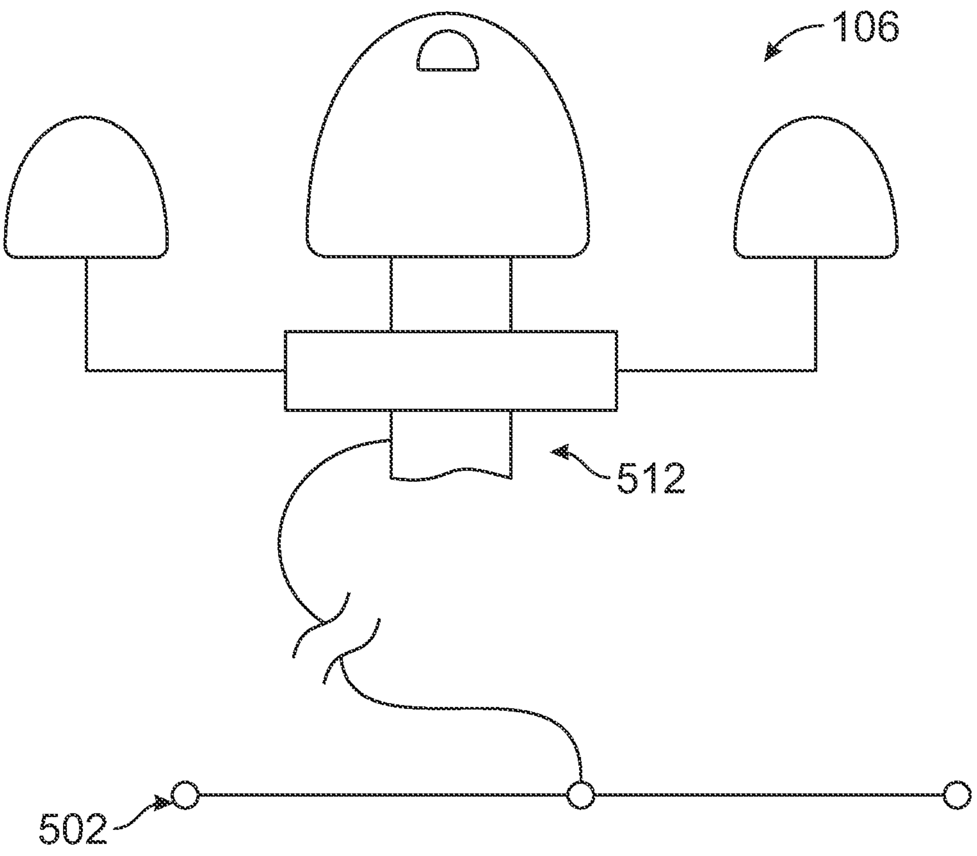
FIG. 6A illustrates an operator seat communicatively-coupled to a communication bus via an operator presence module, in accordance with an example implementation.
Figure 6B:
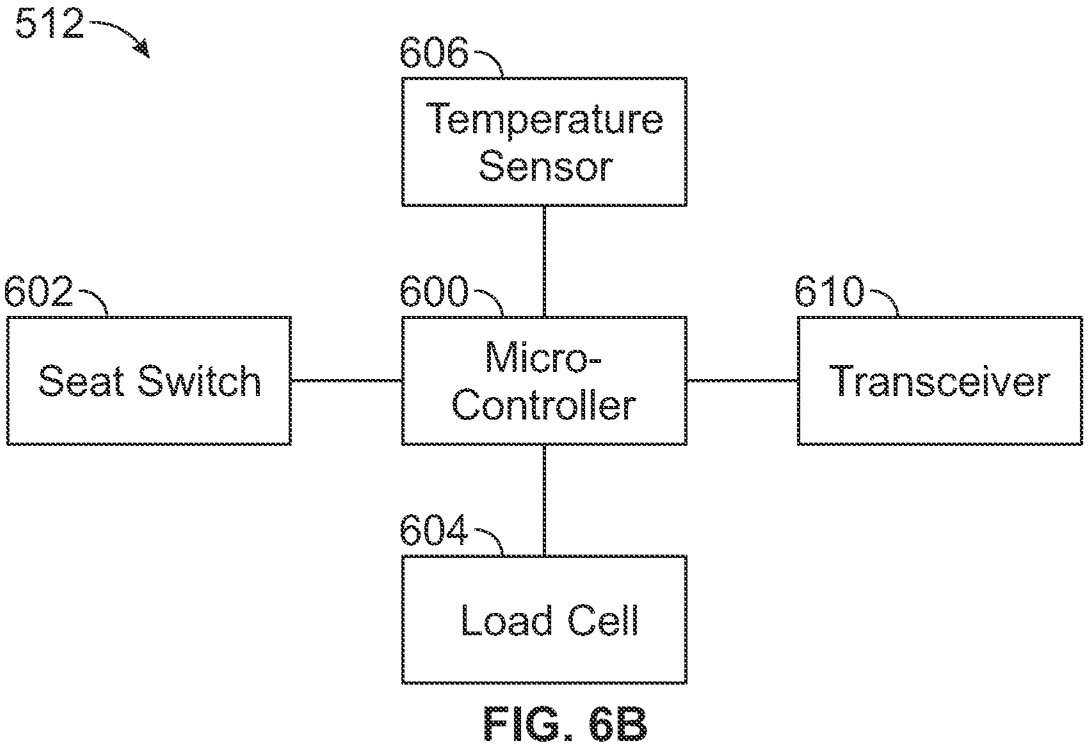
FIG. 6B is a block diagram of the operator presence module of FIG. 6A, in accordance with an example implementation.

FIG. 6A illustrates the operator seat 106 communicatively-coupled to the communication bus 502 via the operator presence module 512, and FIG. 6B is a block diagram of the operator presence module 512, in accordance with an example implementation. Although the operator presence module 512 is depicted underneath the operator seat 106, it could be placed in other locations about the operator seat 106.

As shown in FIG. 6B, in an example implementation, the operator presence module 512 includes a microcontroller 600, a seat switch 602, a load cell 604, a temperature sensor 606, and a transceiver 610 (e.g., an electronic device, which is a combination of a radio transmitter and a receiver, that can both transmit and receive radio waves using an antenna, for communication purposes). The microcontroller 600 can include a processor (e.g., a microprocessor, a digital signal processor, etc.) configured to execute program code including one or more instructions for implementing the operations described herein with respect to the operator presence module 512.

The seat switch 602 is configured to detect operator presence (e.g., whether the operator is seated on the operator seat 106 to operate the mower 100). The seat switch 602 can be a mechanical switch or a Hall Effect sensor, as examples. Once an operator is seated in the operator seat 106, the seat switch 602 detects the operator's presence and indicates such presence to the microcontroller 600, which may then broadcast such information on the communication bus 502 via the transceiver 610.

In the example implementation of FIG. 6B, the operator presence module 512 also includes a load cell 604 (or any other type of force sensor). The load cell 604 may provide a confirmation that the operator seat 106 is seated. If the seat switch 602 indicates that the operator is seated, but the load cell 604 does not detect the weight of the operator, then the microcontroller 600 may determine that either the seat switch 602 or the load cell 604 has a fault, and may transmit information indicating such fault for other devices to operate in a safe mode.

Additionally, the microcontroller 600 may broadcast the weight of the operator on the communication bus 502 such that the other devices can respond accordingly. For example, the weight of the operator may affect the maximum speed allowed for the mower 100 or other safety precautions.

The temperature sensor 606 may indicate a temperature of the operator seat 106 or a temperature of the operator presence module 512. Such temperature may be indicative of a health status or condition of the operator presence module 512. Also, temperature data may be collected for performance tracking. For instance, temperature may be tracked against performance of a particular module to provide information as to how the module performs in different operating environments. As such, the microcontroller 600 receives sensor information from the temperature sensor 606, and responsively broadcasts information over the communication bus 502 indicative of the health and integrity of the operator presence module 512 (e.g., whether the operator presence module 512 is operating properly). Such indication may, for example, operate as a measure of the reliability of the information indicating the presence and/or weight of the operator.

As such, the operator presence module 512 can broadcast at least four messages on the communication bus 502. A message indicating whether the operator is present (e.g., seated in the operator seat 106), a message indicating a weight (or weight range) of the operator, a message indicate a temperature of the operator seat 106 or the operator presence module 512, and a message indicating whether the operator presence module 512 is operating properly or a fault has occurred.

Further, although the example implementation of FIGS. 6A-6B describes a seat switch, it should be understood that, in other example implementations, the operator presence module 512 can detect operator presence in other ways. For example, for a stand-on mower, the operator presence module 512 can include a sensor on a standing platform of the mower to detect operator's presence. In other examples, the steering control levers 108, 109 may have touch-sensitive sensors integrated therewith that indicate whether an operator has touched or is holding the steering control levers 108, 109, thereby indicating operator's presence.

The devices, or at least a subset thereof, of the control system 500 may be configured similar to the operator presence module 512 in that they may each have a microcontroller for processing information and making determinations accordingly, a transceiver for communicating with the communication bus 502, and one or more sensors that facilitate capturing information or measurements associated with operations of each particular device. Further, the health status of the individual modules can be used for trouble shooting. For instance, service technicians, owner, or operators could receive diagnostic codes indicating that the individual module is having problems, or may receive information about number of cycles or period of use, which may indicate whether maintenance or replacement is due.

Another advantage of the network-based configuration of the control system 500 is that other functionality can be added by connecting other modules to the communication bus 502. For example, a vehicle manufacturer may over time produce modules that can enhance operations and performance of the mower 100, and such modules can be added as they become available. As another example, optional modules can be obtained and plugged into the communication bus 502 to add functionality as desired.

Figure 7:
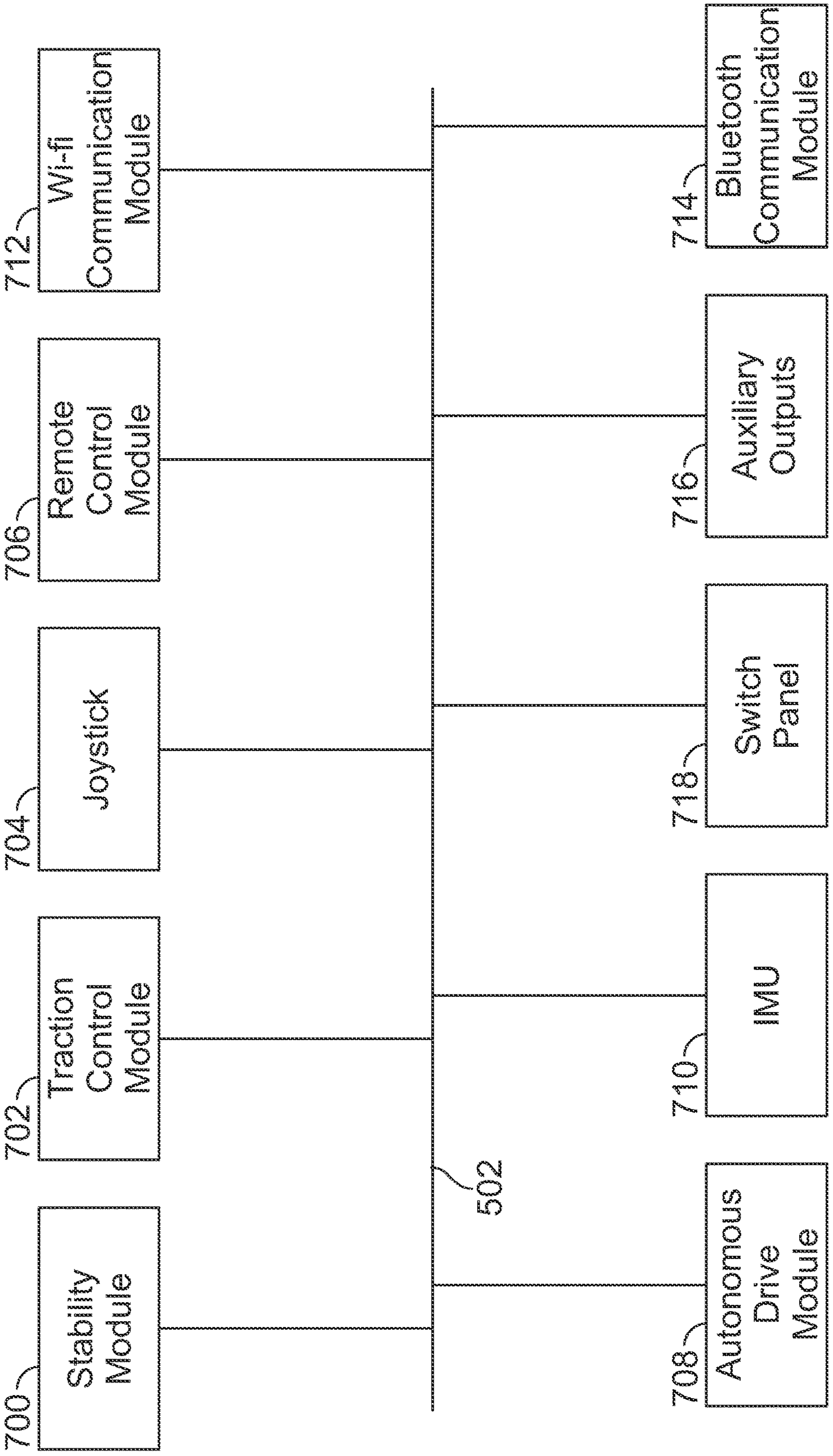
FIG. 7 illustrates additional modules connected to the communication bus of FIG. 5, in accordance with an example implementation.

FIG. 7 illustrates additional modules connected to the communication bus 502, in accordance with an example implementation. As mentioned above, a manufacturer may produce additional performance enhancing modules or the operator may wish to add optional modules during the life of the mower 100. For example, one such module may be a stability module 700, which can include sensors and other features that assists with handling the mower 100 correctly during cornering, particularly if the sensors of the stability module 700 detect understeer or oversteer. Functionality of the stability module 700 may be useful when the wheels 110, 112 have different amounts of grip, e.g., during skidding or plowing, for example. The stability module 700 may communicate command signals to other modules (e.g., the drive motor controllers 504-506) and receive information from the other modules via the communication bus 502.

Another example module is a traction control module 702. The traction control module 702 may be configured as an anti-slip regulation module that uses wheel speed sensors to measure a speed of the mower 100 with the rate at which the wheels 110, 112 are spinning, to detect if there is any slip occurring between the wheels 110, 112 and the road. The traction control module 702 can responsively provide command signals to the drive motor controllers 504-506 to alleviate such slip.

In another example, an operator may prefer to use a steering wheel, or one or more joysticks instead of the steering control levers 108, 109 to control propulsion of the mower 100. In this example, the operator may connect a joystick 704 to the communication bus 502. The drive motor controllers 504-506 may receive signals from the joystick 704 over the communication bus 502, and operate the electric motors coupled to the wheels 110, 112 based on such signals rather than, or in addition to, signals from the steering control levers 108, 109.

In another example, the operator may wish to remotely control operation of the mower 100. In this example, the operator may plug a remote control module 706 to the communication bus 502. The operator can use the remote control module 706 along with a remote controller to propel the mower 100. For example, the remote control module 706 may override the signal from the operator presence module 512 as an operator would not be sitting in the operator seat 106, to allow the drive motor controllers 504, 506 to operate the propulsion electric motors via commands from the remote controller.

In another example, the manufacturer of the mower 100 may have an autonomous drive module 708 as an optional module that an operator could plug in the communication bus 502. The autonomous drive module 708 may include various sensors (e.g., radars, lidars, ultrasonic sensors, cameras, etc.) that capture the environment of the mower 100. The autonomous drive module 708 then controls steering, propulsion, and the blades of the mower 100 to operate the mower 100 autonomously to accomplish a task.

In another example, the operator may add an inertial measurement unit, IMU 710 to the network to enhance operation of the mower 100. The IMU 710 may have sensors (e.g., accelerometers, gyroscopes, etc.) that detect a degree of inclination of the mower 100 (whether the mower is on flat ground or a ramp and the degree of the inclination of the ramp), and responsively sends command signals to the drive motor controllers 504, 506 to adjust the torque produced by the electric motors coupled to the wheels 110, 112 based on the degree of inclination.

In another example, rather than communicating with other computing devices (e.g., via the cellular communication module 530 or via the USB connector 532) the operator may add a Wi-Fi communication module 712 and/or a Bluetooth communication module 714, among other possible modules enabling the use of various communication protocols. This way, the control system 500 can communicate with external devices via any desired communication protocol.

In another example, the operator may desire to add other auxiliary outputs 716 to the control system 500. Example auxiliary devices may include beacon lights, flashing lights, warning beepers, etc. It may be advantageous to connect such auxiliary outputs directly to the communication bus 502 instead of to a switch control. For instance, a rotating beacon module can be configured to automatically turn on if the steering control levers 108, 109 actuated (e.g., are out of neutral).

As another example, an operator may wish to add functionality controlled by various switches. For instance, the operator may wish to add lights that can be controlled via a switch panel 718. The operator may thus connect the switch panel 718 (e.g., a communication network-based switch panel) to the communication bus 502.

Figure 8:
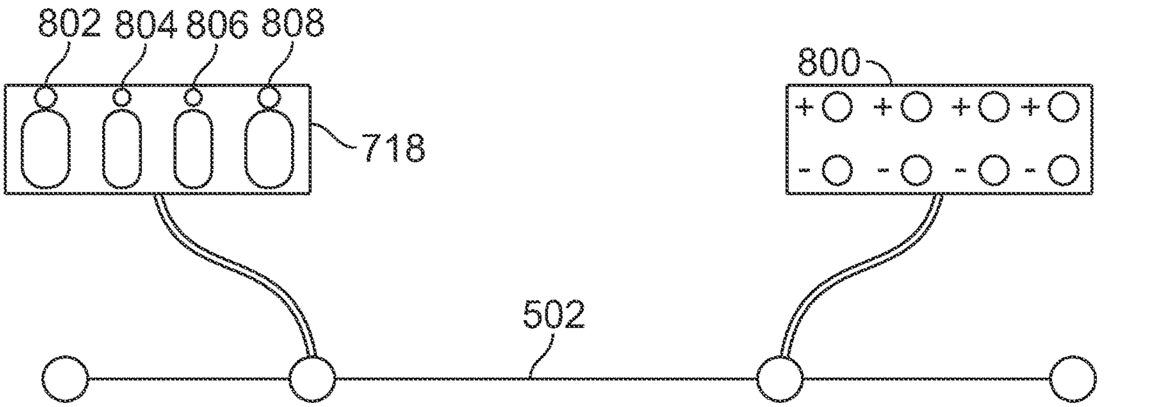
FIG. 8 illustrates a switch panel and a relay panel connected to the communication bus, in accordance with an example implementation, in accordance with an example implementation.

FIG. 8 illustrates the switch panel 718 and a relay panel 800 connected to the communication bus 502, in accordance with an example implementation. The switch panel 718 includes a switch 802, a switch 804, a switch 806, and a switch 808. The switch panel 718 is depicted as having four switches as an example for illustration only. More or fewer switches could be used.

The switches 802-808 are configured to provide signals to the communication bus 502 indicating their state. For example, if a switch is turned on by the operator, a "High" signal (e.g., 5 volts) may be provided to the communication bus 502; otherwise, a "Low" signal (e.g., 0 volts) is provided to the communication bus 502. In some examples, one or more of the switches 802-808 can be added to a joystick or steering control levers 108, 109 as thumb, trigger, or other types of buttons on the joystick (or steering control levers 108, 109) that provide outputs to the communication bus 502.

The relay panel 800 has four relays respectively corresponding to the switches 802-808. The relay panel 800 may be positioned close to the items (e.g., the lights) being controlled by the switches 802-808. A "High" signal from one of the switches 802-808 triggers the corresponding relay of the relay panel 800, which in turn operates the corresponding item.

As such, with the configuration of the control system 500, additional modules can be added as desired. This is accomplished without having to configure a central processor to communicate with the additional modules. Rather, such modules communicate directly with other modules connected to the communication bus 502.

Further, as mentioned above, the control system 500 may include the display device 528 connected to the communication bus 502. The display device 528 includes a processor that is configured to generate a display of a graphical user interface (GUI) depicting information received via the communication bus 502.

FIG. 9 illustrates the display device 528, in accordance with an example implementation. The display device 528 has a processor configured to generate a display of or visually present a GUI 900 on a screen 902 (e.g., a touchscreen) to allow the operator to monitor the state of the mower 100. In an example, the display device 528 may allow the operator to interact with the mower 100 through user-selectable on-screen graphical items (e.g., buttons, menus, widgets, scroll bars, graphical objects, audio indicators, icons, etc.) to facilitate user-interaction.

The GUI 900 shows data associated with the various devices of the control system 500, for example. For instance, the GUI 900 may include a battery indicator 904 providing a visual representation of the charge state of the battery of the mower 100, if the mower 100 is batter-driven.

In another example, the GUI 900 may include a status bar 906 that conveys information associated with various devices or sensors of the mower 100 such as presence of the operator (via the seat switch 602), status of the PTO switch 516, status of the blades (e.g., whether the blades are spinning), and any warnings associated with any of the components of the mower 100.

In an example, the GUI 900 may include a box 908 displaying information associated with an environment and location of the mower 100 such as a map, a temperature of an environment of the mower 100, etc. In an example, the GUI 900 may include a maintenance indicator 910 displaying a number of operating hours left till the next maintenance is due.

In an example where the mower 100 includes the IMU 710, the GUI 900 may include an inclination indicator 912. The inclination indicator 912 displays information, graphical and/or textual, associated with a degree of inclination of the mower 100 to provide a warning to the operator if the inclination or tilt of the mower 100 exceeds a threshold angle, for example.

The display information shown in FIG. 9 are example for illustration only. The GUI 900 may show information from any of the other devices described above. The GUI 900 may also enable the operator to provide user inputs through the screen 902 or other input devices (e.g., buttons, switches, etc.).

Figure 10:
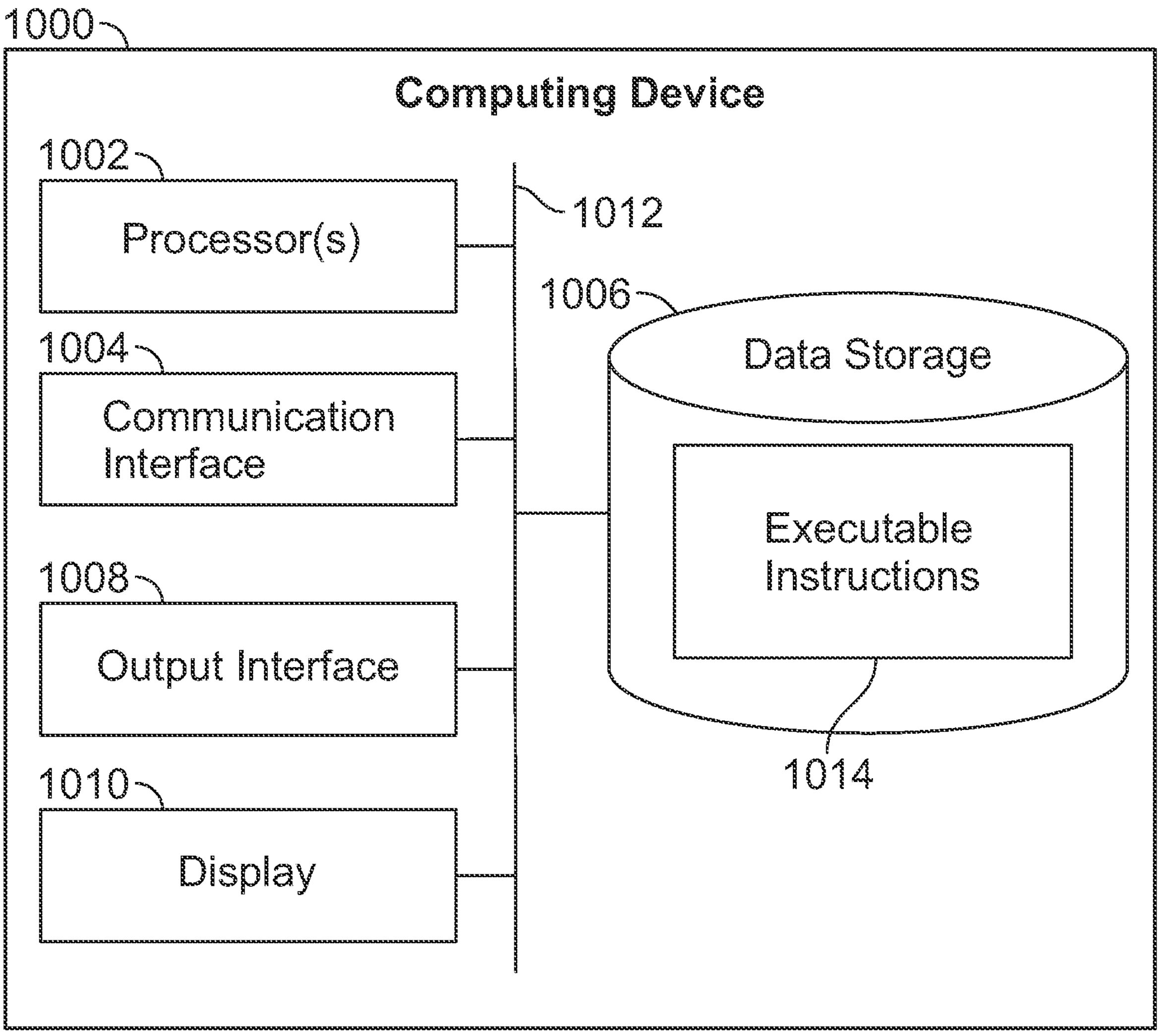
FIG. 10 is a block diagram of a computing device, in accordance with an example implementation.

FIG. 10 is a block diagram of a computing device 1000, according to an example implementation. The computing device 1000 can represent, or can be included in, any of the devices and sensors described above (e.g., the operator presence module 512, the drive motor controllers 504, 506, the blade motor controllers 518-522, the display device 528, the BMS 524, any of the sensors, switches, or input devices shown in FIGS. 5, 6B, 7, etc.).

The computing device 1000 may have processor(s) 1002, a communication interface 1004, and data storage 1006, each connected to a communication bus 1012. The computing device 1000 may also include hardware to enable communication within the computing device 1000 and between the computing device 1000 and the communication bus 502. The hardware may include transmitters, receivers, and antennas, for example The communication interface 1004 may be a wireless interface and/or one or more wireline interfaces that allow for both short-range communication and long-range communication to one or more networks or to one or more remote devices (e.g., to allow communication with the communication bus 502). Such wireless interfaces may provide for communication under one or more wireless communication protocols, Bluetooth, Wi-Fi (e.g., an institute of electrical and electronic engineers (IEEE) 802.11 protocol), Long-Term Evolution (LTE), cellular communications, near-field communication (NFC), and/or other wireless communication protocols. Wireline interfaces may include an Ethernet interface, a CAN network interface, a USB interface, or similar interface to communicate via a wire, a twisted pair of wires, a coaxial cable, an optical link, a fiber-optic link, or other physical connection to a wireline network. Thus, the communication interface 1004 may be configured to receive input data from the communication bus 502, and may be configured to send output data to the communication bus 502.

The data storage 1006 may include or take the form of one or more computer-readable storage media that can be read or accessed by the processor(s) 1002. The computer-readable storage media can include volatile and/or non-volatile storage components, such as optical, magnetic, organic or other memory or disc storage, which can be integrated in whole or in part with the processor(s) 1002. The data storage 1006 is considered non-transitory computer readable media. In some examples, the data storage 1006 can be implemented using a single physical device (e.g., one optical, magnetic, organic or other memory or disc storage unit), while in other examples, the data storage 1006 can be implemented using two or more physical devices.

The data storage 1006 thus is a non-transitory computer readable storage medium, and executable instructions 1014 are stored thereon. The executable instructions 1014 include computer executable code. When the executable instructions 1014 are executed by the processor(s) 1002, the processor(s) 1002 are caused to perform operations of the computing device 1000 (e.g., operations performed by any of the devices, modules, sensors described above).

The processor(s) 1002 may be a general-purpose processor or a special purpose processor (e.g., digital signal processors, application-specific integrated circuits (ASIC), etc.). The processor(s) 1002 may receive inputs from the communication interface 1004, and process the inputs to generate outputs that are stored in the data storage 1006. The processor(s) 1002 can be configured to execute the executable instructions 1014 (e.g., computer-readable program instructions) that are stored in the data storage 1006 and are executable to provide the functionality of the computing device 1000 described herein.

If the computing device 1000 represents the display device 528, the computing device 1000 can further include an output interface 1008 and a display 1010. The output interface 1008 outputs information to the display 1010 or to other components as well. Thus, the output interface 1008 can be a wireless interface (e.g., transmitter) or a wired interface as well. The processor(s) 1002 may receive inputs from the communication interface 1004, and process the inputs to generate outputs to the display 1010.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiment (EEEs) listed below.

EEE 1 is a control system for a mower, the control system comprising: a communication bus; and a plurality of devices that are communicatively-coupled to the communication bus, such that each device of the plurality of devices is in direct communication with other devices of the plurality of devices, wherein the plurality of devices comprise: at least one drive motor controller of an electric motor configured to drive the mower, at least one blade motor controller of a respective electric motor configured to drive one or more blades of a mower deck of the mower, an input device configured to be operated by an operator of the mower, and a operator presence module configured to provide a signal to the communication bus indicating presence of the operator.

EEE 2 is the control system of EEE 1, wherein the plurality of devices further comprise: a battery configured to provide electric power to the electric motor and the respective electric motor; and a battery management system configured to broadcast to the communication bus a signal indicative of a condition of the battery.

EEE 3 is the control system of EEE 2, wherein the at least one blade motor controller is configured to perform operations comprising: receiving, via the communication bus, the signal from the operator presence module indicating the presence of the operator; receiving, via the communication bus, information from the battery management system indicating the condition of the battery; and placing the respective electric motor in a standby mode to be ready to spin the one or more blades based on the signal from the operator presence module and the condition of the battery.

EEE 4 is the control system of any of EEEs 1-3, wherein the plurality of devices further comprise: a brake engagement sensor configured to broadcast on the communication bus a signal indicating whether a parking brake is engaged, wherein the at least one blade motor controller causes the respective electric motor to stop spinning the one or more blades in response to the signal from the brake engagement sensor indicating that the parking brake is engaged.

EEE 5 is the control system of any of EEEs 1-4, wherein the plurality of devices further comprise: a power take-off switch configured to broadcast on the communication bus a signal indicating whether the operator has engaged a power take-off mechanism to drive the one or more blades, wherein the at least one blade motor controller causes the respective electric motor to spin in response to the signal from the power take-off switch.

EEE 6 is the control system of any of EEEs 1-5, wherein the plurality of devices further comprise: a cellular communication module configured to allow the control system to communicate with a remote server.

EEE 7 is the control system of any of EEEs 1-6, wherein the operator presence module comprises: a seat switch configured to detect the presence of the operator on an operator seat of the mower; a load cell configured to provide an indication of a weight of the operator; and a transceiver configured to communicate information from the seat switch and the load cell to the communication bus, wherein the at least one drive motor controller operates the electric motor based on the information.

EEE 8 the control system of EEE 7, wherein the operator presence module further comprises: a temperature sensor configured to provide sensor information indicative of a temperature of the operator seat to the communication bus.

EEE 9 is the control system of any of EEEs 1-8, wherein the at least one drive motor controller comprises: a first motor controller configured to control a first electric motor configured to propel a first wheel of the mower; and a second motor controller configured to control a second electric motor configured to propel a second wheel of the mower.

EEE 10 is the control system of any of EEEs 1-9, wherein the input device comprises one or more steering control levers or a joystick.

EEE 11 is the control system of any of EEEs 1-10, wherein the communication bus is a Controller Area Network bus or a Universal Serial Bus.

EEE 12 is the control system of any of EEEs 11, wherein the plurality of devices further comprise: a display device configured to display information received via the communication bus from other devices of the plurality of devices.

EEE 13 is the control system of any of EEEs 1-12, wherein the communication bus is configured to accommodate additional modules including one or more of: (i) a stability module, (ii) a traction control module, (iii) a remote control module, (iv) an autonomous drive module, (v) an inertial measurement unit, (vi) a switch panel, (vii) a Wi-Fi communication module, (viii) a Bluetooth communication module.

EEE 14 is a mower comprising: a first wheel; a second wheel; at least one electric motor configured to propel the first wheel and the second wheel; a mower deck comprising at least one respective electric motor configured to spin one or more blades disposed in the mower deck; and a control system comprising: (i) a communication bus, and (ii) a plurality of devices that are communicatively-coupled to the communication bus, such that each device of the plurality of devices is in direct communication with other devices of the plurality of devices, wherein the plurality of devices comprise: at least one drive motor controller configured to control the at least one electric motor that propel the first wheel and the second wheel, at least one blade motor controller configured to control the at least one respective electric motor of the mower deck, an input device configured to be operated by an operator of the mower, and a operator presence module configured to provide a signal to the communication bus indicating presence of the operator.

EEE 15 is the mower of EEE 14, further comprising: a battery configured to provide electric power to the at least one electric motor and the at least one respective electric motor, wherein the plurality of devices of the control system further comprise: a battery management system configured to broadcast to the communication bus a signal indicative of a condition of the battery.

EEE 16 is the mower of EEE 15, wherein the at least one blade motor controller is configured to perform operations comprising: receiving, via the communication bus, the signal from the operator presence module indicating the presence of the operator; receiving, via the communication bus, information from the battery management system indicating the condition of the battery; and placing the at least one respective electric motor in a standby mode to be ready to spin the one or more blades based on the signal from the operator presence module and the condition of the battery.

EEE 17 is the mower of any of EEEs 14-16, wherein the plurality of devices further comprise: a brake engagement sensor configured to broadcast on the communication bus a signal indicating whether a parking brake is engaged, wherein the at least one blade motor controller causes the at least one respective electric motor to stop spinning the one or more blades in response to the signal from the brake engagement sensor indicating that the parking brake is engaged.

EEE 18 is the mower of any of EEEs 14-17, wherein the plurality of devices further comprise: a power take-off switch configured to broadcast on the communication bus a signal indicating whether the operator has engaged a power take-off mechanism to drive the one or more blades, wherein the at least one blade motor controller causes the at least one respective electric motor to spin the one or more blades in response to the signal from the power take-off switch.

EEE 19 is the mower of any of EEEs 14-18, wherein the operator presence module comprises: a seat switch configured to detect the presence of the operator on an operator seat of the mower; a load cell configured to provide an indication of a weight of the operator; and a transceiver configured to communicate information from the seat switch and the load cell to the communication bus, wherein the at least one drive motor controller operates the electric motor based on the information.

EEE 20 is the mower of any of EEEs 14-19, wherein the at least one drive motor controller comprises: a first motor controller configured to control a first electric motor configured to propel the first wheel of the mower; and a second motor controller configured to control a second electric motor configured to propel the second wheel of the mower.

What is claimed is:

1. A control system for a mower, the control system comprising:
- a communication bus of the mower; and
- a plurality of devices that are distinct from each other and communicatively-coupled to the communication bus of the mower, such that each device of the plurality of devices is in direct communication with other devices of the plurality of devices via the communication bus of the mower, wherein the plurality of devices comprise:
  - at least one drive motor controller of an electric motor configured to drive the mower,
  - at least one blade motor controller of a respective electric motor configured to drive one or more blades of a mower deck of the mower,
  - an input device configured to be operated by an operator of the mower, and
  - an operator presence module configured to provide a signal to the communication bus indicating presence of the operator.

2. The control system of claim 1, wherein the plurality of devices further comprise:
- a battery configured to provide electric power to the electric motor and the respective electric motor; and
- a battery management system configured to broadcast to the communication bus a signal indicative of a condition of the battery.

3. The control system of claim 2, wherein the at least one blade motor controller is configured to perform operations comprising:
- receiving, via the communication bus, the signal from the operator presence module indicating the presence of the operator;
- receiving, via the communication bus, information from the battery management system indicating the condition of the battery; and
- placing the respective electric motor in a standby mode to be ready to spin the one or more blades based on the signal from the operator presence module and the condition of the battery.

4. The control system of claim 1, wherein the plurality of devices further comprise:
- a brake engagement sensor configured to broadcast on the communication bus a signal indicating whether a parking brake is engaged, wherein the at least one blade motor controller causes the respective electric motor to stop spinning the one or more blades in response to the signal from the brake engagement sensor indicating that the parking brake is engaged.

5. The control system of claim 1, wherein the plurality of devices further comprise:

a power take-off switch configured to broadcast on the communication bus a signal indicating whether the operator has engaged a power take-off mechanism to drive the one or more blades, wherein the at least one blade motor controller causes the respective electric motor to spin in response to the signal from the power take-off switch.

6. The control system of claim 1, wherein the plurality of devices further comprise:

a cellular communication module configured to allow the control system to communicate with a remote server.

7. The control system of claim 1, wherein the operator presence module comprises:

an operator presence switch configured to detect the presence of the operator on an operator seat of the mower;

a load cell configured to provide an indication of a weight of the operator; and a transceiver configured to communicate information from the seat switch and the load cell to the communication bus, wherein the at least one drive motor controller operates the electric motor based on the information.

8. The control system of claim 7, wherein the operator presence module further comprises:

a temperature sensor configured to provide sensor information indicative of a temperature of the operator seat to the communication bus.

9. The control system of claim 1, wherein the at least one drive motor controller comprises:

a first motor controller configured to control a first electric motor configured to propel a first wheel of the mower; and a second motor controller configured to control a second electric motor configured to propel a second wheel of the mower.

10. The control system of claim 1, wherein the input device comprises one or more steering control levers, steering wheel, or one or more joysticks.

11. The control system of claim 1, wherein the communication bus is a Controller Area Network bus or a Universal Serial Bus.

12. The control system of claim 1, wherein the plurality of devices further comprise:

a display device configured to display information received via the communication bus from other devices of the plurality of devices.

13. The control system of claim 1, wherein the communication bus is configured to accommodate additional modules including one or more of: (i) a stability module, (ii) a traction control module, (iii) a remote control module, (iv) an autonomous drive module, (v) an inertial measurement unit, (vi) a switch panel, (vii) a Wi-Fi communication module, (viii) a Bluetooth communication module.

14. A mower comprising:

a first wheel;

a second wheel;

at least one electric motor configured to propel the first wheel and the second wheel;

a mower deck comprising at least one respective electric motor configured to spin one or more blades disposed in the mower deck;

a communication bus; and a control system comprising: (i) the communication bus, and (ii) a plurality of devices that are distinct from each other and communicatively-coupled to the communication bus of the mower, such that each device of the plurality of devices is in direct communication with other devices of the plurality of devices via the communication bus of the mower, wherein the plurality of devices comprise:

at least one drive motor controller configured to control the at least one electric motor that propel the first wheel and the second wheel, at least one blade motor controller configured to control the at least one respective electric motor of the mower deck, an input device configured to be operated by an operator of the mower, and an operator presence module configured to provide a signal to the communication bus indicating presence of the operator.

15. The mower of claim 14, further comprising:

a battery configured to provide electric power to the at least one electric motor and the at least one respective electric motor, wherein the plurality of devices of the control system further comprise:

a battery management system configured to broadcast to the communication bus a signal indicative of a condition of the battery.

16. The mower of claim 15, wherein the at least one blade motor controller is configured to perform operations comprising:

receiving, via the communication bus, the signal from the operator presence module indicating the presence of the operator;

receiving, via the communication bus, information from the battery management system indicating the condition of the battery; and placing the at least one respective electric motor in a standby mode to be ready to spin the one or more blades based on the signal from the operator presence module and the condition of the battery.

17. The mower of claim 14, wherein the plurality of devices further comprise:

a brake engagement sensor configured to broadcast on the communication bus a signal indicating whether a parking brake is engaged, wherein the at least one blade motor controller causes the at least one respective electric motor to stop spinning the one or more blades in response to the signal from the brake engagement sensor indicating that the parking brake is engaged.

18. The mower of claim 14, wherein the plurality of devices further comprise:

a power take-off switch configured to broadcast on the communication bus a signal indicating whether the operator has engaged a power take-off mechanism to drive the one or more blades, wherein the at least one blade motor controller causes the at least one respective electric motor to spin the one or more blades in response to the signal from the power take-off switch.

19. The mower of claim 14, wherein the operator presence module comprises:

a seat switch configured to detect the presence of the operator on an operator seat of the mower;

a load cell configured to provide an indication of a weight of the operator; and a transceiver configured to communicate information from the seat switch and the load cell to the communication bus, wherein the at least one drive motor controller operates the electric motor based on the information.

20. The mower of claim 14, wherein the at least one drive motor controller comprises:

a first motor controller configured to control a first electric motor configured to propel the first wheel of the mower; and a second motor controller configured to control a second electric motor configured to propel the second wheel of the mower.

* * * * *